(12) United States Patent
Shirkhan

(10) Patent No.: US 8,062,520 B2
(45) Date of Patent: Nov. 22, 2011

(54) REPLACEABLE COLUMN FOR PRESSURIZED LIQUID EXTRACTION SYSTEM

(75) Inventor: Hamid Shirkhan, Manchester, MA (US)

(73) Assignee: Fluid Management Systems, Inc., Waltham, MA (US)

( * ) Notice: Subject to any disclaimer, the term of this patent is extended or adjusted under 35 U.S.C. 154(b) by 805 days.

(21) Appl. No.: 11/894,743

(22) Filed: Aug. 21, 2007

(65) Prior Publication Data

US 2009/0050548 A1 Feb. 26, 2009

Related U.S. Application Data

(60) Provisional application No. 60/839,075, filed on Aug. 21, 2006.

(51) Int. Cl.
*B01D 11/02* (2006.01)

(52) U.S. Cl. ....... 210/232; 210/450; 422/68.1; 422/261; 422/550; 422/916

(58) Field of Classification Search .................. 422/68.1, 422/261, 550, 916; 210/232, 450
See application file for complete search history.

(56) References Cited

U.S. PATENT DOCUMENTS

| 4,861,561 A | 8/1989 | Pritchard |
| 5,361,921 A | 11/1994 | Burns |
| 5,670,048 A * | 9/1997 | Davison et al. ............... 210/634 |
| 5,879,634 A | 3/1999 | Ford |
| 6,565,814 B1 * | 5/2003 | Anraku et al. ................ 422/550 |
| 6,783,668 B2 | 8/2004 | Shirkhan |
| 2003/0096422 A1 | 5/2003 | Ong et al. |

\* cited by examiner

*Primary Examiner* — Terry Cecil

(74) *Attorney, Agent, or Firm* — Weingarten, Schurgin, Gagnebin & Lebovici LLP

(57) ABSTRACT

A system for pressurized liquid extraction of solid samples including quick-connect, threadless columns for holding the solid sample is disclosed. A pressurized liquid extraction (PLE) module continuously performs extraction on the solid sample to yield liquid sample. The quick-connect columns include a threadless, cylindrical tube and end cap assemblies, which are structured and arranged to provide a tight interference fit with the inner surface of the annulus of the column portion and with top and bottom cup rings.

13 Claims, 9 Drawing Sheets

REPLACEABLE COLUMN FOR PRESSURIZED LIQUID EXTRACTION SYSTEM

CROSS REFERENCE TO RELATED APPLICATIONS

This application claims priority under 35 U.S.C. §119(e) of U.S. Provisional Patent Application No. 60/839,075 filed Aug. 21, 2006, the disclosure of which is hereby incorporated by reference herein.

STATEMENT REGARDING FEDERALLY SPONSORED RESEARCH OR DEVELOPMENT

Not Applicable

BACKGROUND OF THE INVENTION

The present invention is related to the field of agro-products, pharmaceutical production, and sample analysis and, more particularly, to pressurized liquid extraction systems.

In the field of sample analysis, a large variety of studies are conducted in order to monitor the presence of contaminants in food. In particular, antitoxins and toxins such as brominated and chlorinated compounds, pesticides, PCBs, PAHs, PBDE, and dioxins are extracted, purified and fractionated from pharmaceutical, environmental, and biological samples. New and more stringent regulations regarding acceptable levels of these contaminants are continuously being adopted by federal and state governments and/or regulatory agencies, driving the development of analytical systems that are more accurate, reliable and commercially practical.

Important criteria in the development of such systems include the detection of more compounds, with lower detection limits, relatively high throughput, and efficiency. Currently, only a few laboratories can fulfill these emerging requirements.

Since chlorinated and brominated compounds are very toxic at sub-ppt (parts per trillion) and ppqt (parts per quadrillion) levels, the purification of these compounds becomes a difficult task in sample analysis. It is necessary, for example, to protect the sample from interfering compounds during the extraction, purification, and fractionation processes. Indeed, interfering compounds can be introduced from the air and surrounding environment.

For example, it is required to detect some PCBs in low ppt level in food samples. However, the background amount of PCBs in the ambient air and other laboratory surroundings may exceed the detection limits of the sample, so that the laboratories are unable to perform accurate testing. As a result, laboratory testing facilities are increasingly being forced to construct at great cost new, clean room laboratories having controlled environments. Consequently, testing for these highly toxic compounds in food is becoming very difficult, and fewer laboratories are able to perform this testing.

In the field of agro-products, extracted, purified, and separated end products are obtained, e.g., from spices, herbs, aromatic plants, and medicinal plants, for use in various end use applications such as cosmetics, flavors, medicines, perfumes, and so forth.

In the field of pharmaceutical production, compounds of interest are extracted, purified, and separated for use in producing drugs and supplements. These processes are similar to those used in sample analysis, although they are usually carried out on a grander scale, to provide a desired amount of end products.

For recent years, new extraction techniques have emerged that exhibit advantages such as lower solvent consumption, suitability for automation, and higher throughput for processing solid and semi-solid samples such as food samples. The purification or "clean-up" step has also evolved from the early use of semi-automated stages to more recent use of entirely automated systems suitable for preparing a large number of samples.

Thus, there is a continuing need for fast, efficient systems for performing high-quality sample analysis and pharmaceutical production. One such system is the subject of U.S. Pat. No. 6,783,668 to Shirkhan.

The Shirkhan patent discloses a system for pressurized liquid extraction ("PLE") and purification of solid biological materials that contain trace amounts of substances that may be the subject of subsequent analysis or that may be used as an ingredient in a pharmaceutical end product. Exemplary uses of the system include, without limitation, the extraction, purification, and fractionation of trace substances such as antibiotics, pesticides, PCBs, PAHs, PBDE, pesticides, and chlorinated and brominated compounds.

More specifically, according to Shirkhan, extraction, purification, and fractionation are performed in a closed-loop system, which reduces the exposure of the sample to the air and to the surrounding environment. As a result, hundreds of toxins such as dioxins, PCBs, pesticides, and the like can be detected at relatively low concentration levels, e.g., ppqt, in a single run at generally high speed.

The Shirkhan system includes a pressurized liquid extraction (PLE) module having a solvent selection valve, a PLE cell, a heating element, a high-pressure pump, and a pressure regulator. The heating element is thermally coupled to the PLE cell, which includes an over temperature shut-off. The high-pressure pump is coupled to an input port of the PLE cell. The pressure regulator is coupled between an output port of the PLE module and an input port of the PLE cell. The output port of the cooling coil is coupled to the output port of the PLE module.

During operation, the cooling coil conditions the temperature of the extract and transfers the cooled extract to the input of a purification module. The PLE module continuously performs high-pressure, high-temperature extraction on the solid sample to yield a liquid sample, and concurrently provides the liquid sample to the output port of the PLE module for testing.

The Shirkhan system, which is manufactured by Fluid Management Systems, Inc. of Waltham, Mass., provides rapid detection of hundreds of the most toxic compounds in food. In addition, it reduces the need for clean room laboratories, which otherwise might be necessary to perform testing and detection of those toxins. The system, further, simplifies sample handling inside the laboratory.

BRIEF SUMMARY OF THE INVENTION

A system for pressurized liquid extraction, purification, and fractionalization of solid samples including a pressurized liquid extraction (PLE) module using disposable, quick-connect columns for holding the solid sample, silica, alumina, and/or carbon is disclosed. The PLE module continuously performs high-pressure, high-temperature extraction on the solid sample to yield a liquid sample. The quick-connect columns include a cylindrical portion and reusable metal, e.g., stainless steel, and/or disposable plastic end cap assemblies, which are structured and arranged to provide a tight, interference fit with the inner surface of the annulus of the column portion and with top and bottom cup assemblies that releasably attach the quick-connect column to the extraction module of the PLE system.

Other aspects, features, and advantages of the present invention will be apparent from the Detailed Description that follows.

BRIEF DESCRIPTION OF THE SEVERAL VIEWS OF THE DRAWINGS

The invention will be more fully understood by reference to the following Detailed Description of the invention in conjunction with the Drawing, of which.

DETAILED DESCRIPTION OF THE INVENTION

U.S. Provisional Patent Application No. 60/839,075 filed Aug. 21, 2006 is incorporated in its entirety by reference herein.

Integrated Pressurized Liquid Extraction System

Figure 1:
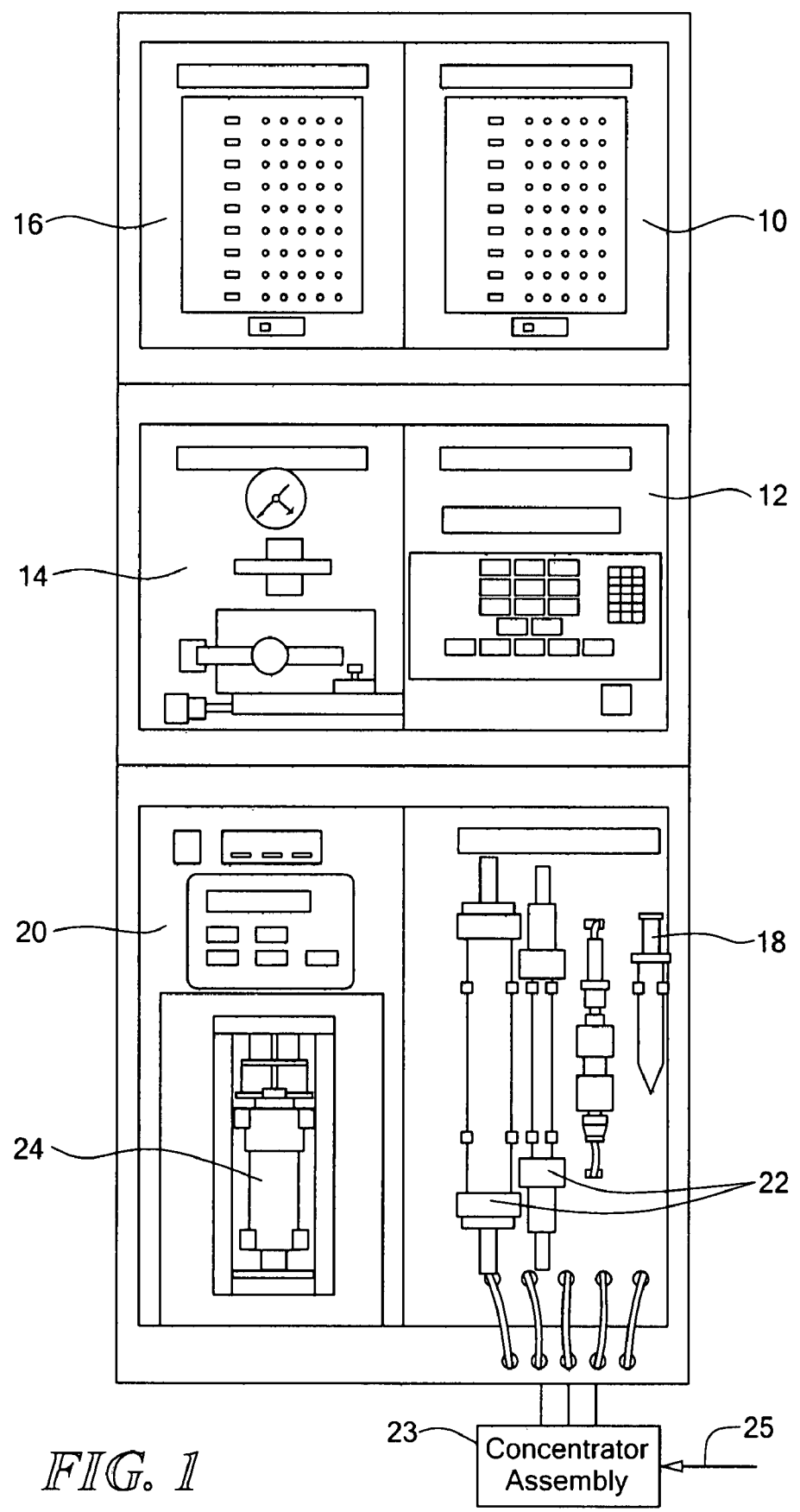
FIG. 1 shows an illustration of a front view of a pressurized liquid extraction (PLE) and purification system in accordance with the Shirkhan patent and the present invention.

FIG. 1 shows a front view of an integrated pressurized liquid extraction (PLE) and optional purification system that can be used to test a variety of solid and semi-solid samples for the presence of any of a number of trace substances. The system includes a power supply module 10, a control module 12, a pump and pressure control module 14, a valve drive module 16, a sample-processing (purification) module 18, and a PLE module 20.

The power supply module 10 supplies electrical power to the system. The control module 12 is adapted to control the operation of all of the system modules making up the system. The control module 12 includes at least one display device and an input/output device, e.g., a keypad, for local operator control. A separate interface to a local or remote controller or processing device (not shown), is also included.

The processing device (not shown), such as a microprocessor, a personal computer, and the like, is adapted to provide editing, memory storage of extraction and purification data, non-volatile memory, e.g., read-only memory (ROM), storage for applications, driver programs, look-up tables and the like, volatile memory, e.g. random access memory (RAM), for executing applications, driver programs, and the like. A non-exclusive list of possible applications and driver programs associated with the processing device can include executable programs for extraction and separation capabilities as well as for real-time monitoring and recording of pressure, temperature, and status of all control valves.

The pump and pressure control module 14 includes a piston pump that is adapted for low-pressure delivery of solvents and extracted samples. Additionally, the pump and pressure control module 14 is structured and arranged for pressure monitoring, overpressure control, and the like. The valve drive module 16 provides drive power to the various valves in the system, described below.

The purification module 18 is adapted to accommodate a plurality of quick-connect columns 22, which are used in separation/purification processes as described below. Output from the purification module 18 are coupled to a concentrator assembly 23, which also receives nitrogen from an inlet 25.

Figure 2:
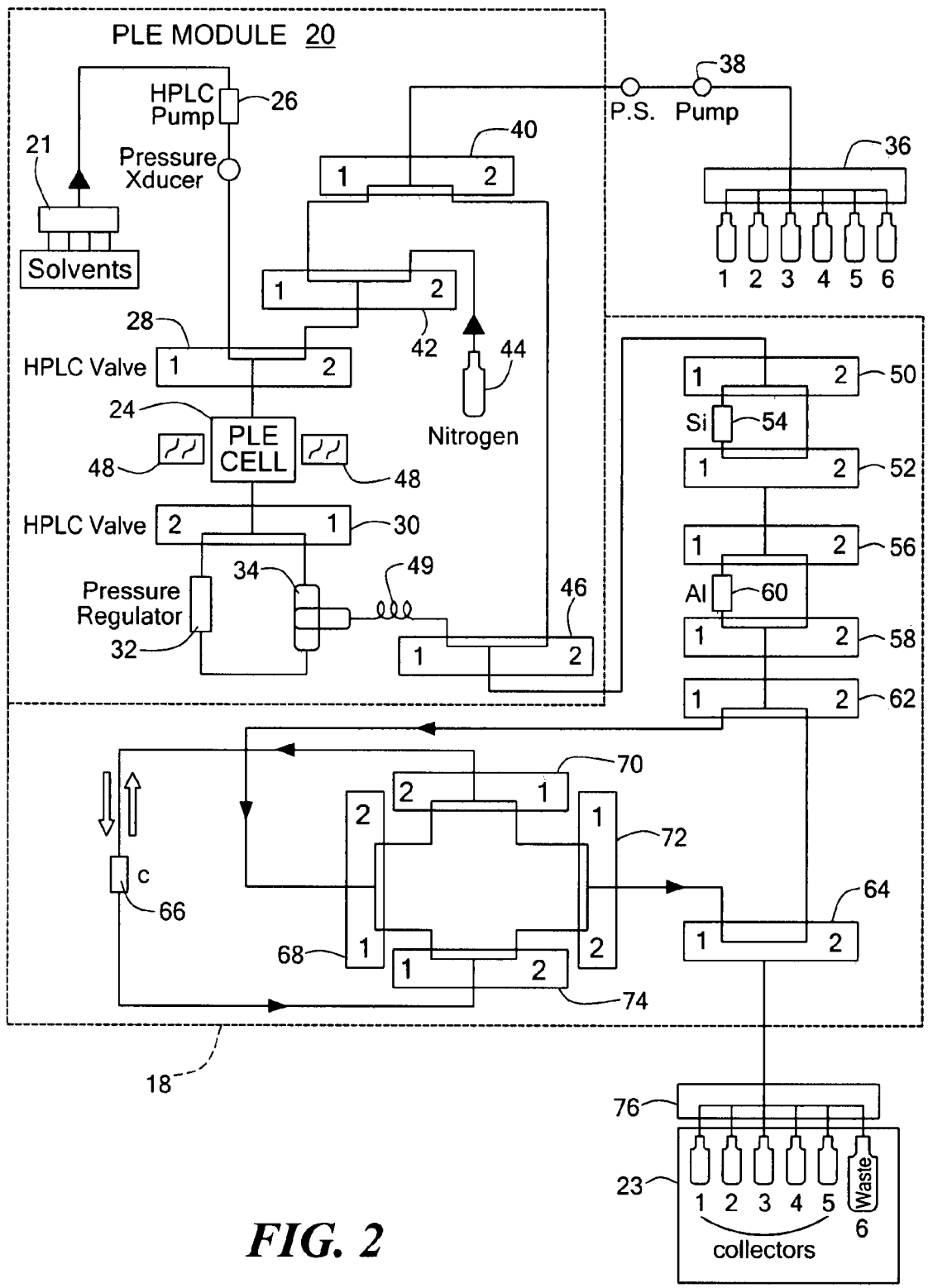
FIG. 2 shows a schematic diagram of the PLE and extraction system of FIG. 1.
Figure 3A:
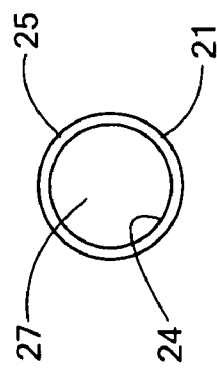
FIG. 3A shows an end view of a hollow, cylindrical portion of the quick connect in accordance with the present invention.
Figure 3B:
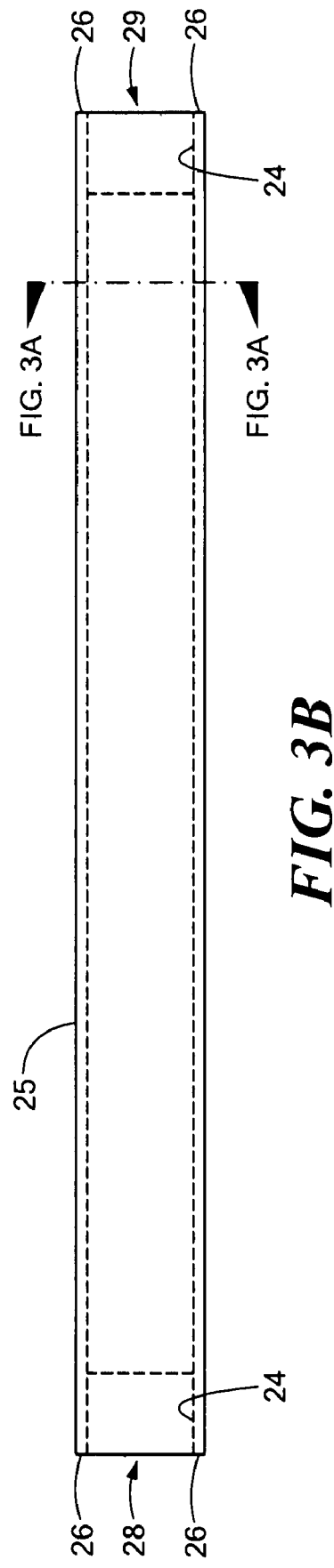
FIG. 3B shows a side view of a hollow, cylindrical portion of the quick connect in accordance with the present invention.
Figure 11:
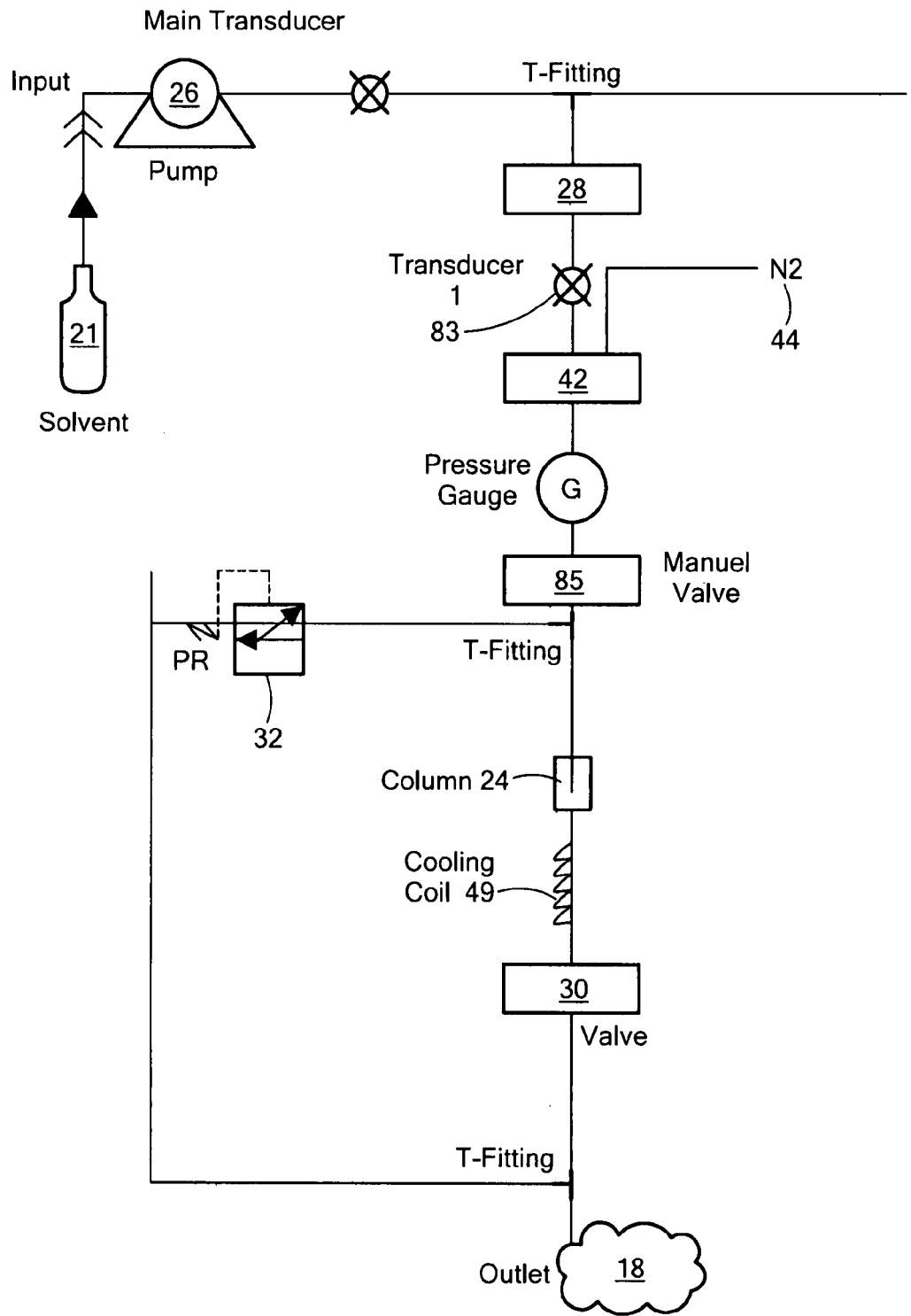
FIG. 11 shows an alternate schematic diagram of the PLE and extraction system of FIG. 1.

FIG. 2 shows the internal configuration and fluidic circuitry of the PLE module 20 and the (optional) purification module 18 of FIG. 1. FIG. 11 shows an alternate internal configuration and fluidic circuitry for the PLE module 20. The principle component of the PLE module 20 is a PLE cell 24, in which the sample is disposed and in which pressurized liquid extraction physically occurs. Typically, the PLE cell 24 is made of a reusable metal or metal alloy, such as stainless steel.

Referring to FIG. 2, the PLC cell 24 is fluidly coupled to an internal solvent source 21 and to an external solvent source 36. Typically, the external solvent source 36 provides solvent for cleaning the PLE cell 24 and the internal solvent source 21 provides solvent for extraction purposes. Alternatively, in FIG. 11, the PLC cell 24 is fluidly coupled to an internal solvent source 21 only and the external solvent source is fluidly coupled directly to the purification module 18.

In FIG. 2, the internal solvent source 21 is coupled to the input port of the PLE cell 24 via a high-performance liquid chromatography (HPLC) pump 26 and an HPLC valve 28. A solvent select valve provides the option of selecting a step or a binary gradient of any combination of various solvents from the internal solvent source 21. The external solvent source 36 is coupled to the input port of the PLE cell 24 via a solvent pump 38 and a plurality of valves 40 and 42, including the HPLC valve 28.

The PLE cell 24 is surrounded by a heating element 48 that is controlled to maintain the PLE cell 24 at a temperature between ambient and a relatively high temperature during extraction. Typical extraction temperatures are in the range of about 120 to about 150 degrees Celsius (about 250-300 degrees Fahrenheit). The output port of the PLE cell 24 is coupled to a pressure regulator 32, which regulates the pressure in the PLE cell 24, and to a T-fitting 34. The output port of the T-fitting 34 is connected to a cooling coil 49, to cool the extracted liquid.

Optionally, the extracted liquid is then provided to the purification module 18 via valve 46, for purification. More specifically, the output of the valve 46 is provided to a first pair of valves 50 and 52, which is associated with a silica (Si)

column 54 that is disposed within the purification module 18. Valves 50 and 52 are adapted to selectively bypass the silica column 54 if desired.

The output of valve 52 is provided to a second pair of valves 56 and 58, which is associated with an alumina (Al) column 60. Valves 56 and 58 are also adapted to selectively bypass the alumina column 60 if desired.

The output of valve 58 is provided to a third pair of valves 62 and 64, which is associated with a carbon (C) column 66. Valves 62 and 64 are adapted to selectively bypass the carbon column 66 if desired. Also associated with the carbon column 66 is a set of four valves 68, 70, 72, and 74, the openings of which can be controlled to provide bidirectional flow of fluid through the carbon column 66. Although purification has been described in connection with columns of silica, alumina, and carbon, the invention is not to be construed as being limited to just these purification materials.

As shown in FIG. 2, the output of the valve 64 is provided to a set of collectors 76 in the concentrator assembly 23 for the separated components as well as waste fluid.

Alternatively, referring to FIG. 11, the internal solvent source 21 is coupled to the input port of the PLE cell 24 via a high-performance liquid chromatography (HPLC) pump 26 and an HPLC valve 28. A solvent select valve provides the option of selecting a step or a binary gradient of any combination of various solvents from the internal solvent source 21.

Solvent exiting the HPLC valve 28 is monitored by a channel transducer 83 and a pressure gauge 84. Prior to entering the PLE cell 24, the solvent is sent through a channel isolation valve 85. After the channel isolation valve 85, the pressure regulator 32, which regulates the pressure in the PLE cell 24, is disposed in parallel with the PLE cell 24. Although not shown in FIG. 11, the PLE cell 24 is surrounded by a heating element 48 that is controlled to maintain the PLE cell 24 at a temperature between ambient and a relatively high temperature during extraction. Typical extraction temperatures are in the range of about 120 to about 150 degrees Celsius (about 250-300 degrees Fahrenheit).

The output port of the PLE cell 24 is coupled to the cooling coil 49, which is also placed immediately after the PLE cell 24 and before HPLC valve 30. Cooled, extracted liquid is either collected or, optionally, purified in the purification module 18.

The various pumps and valves shown in FIG. 2 and FIG. 11 are controlled in accordance with one or more separation application programs or "protocols" that each involve a sequence of steps. At each step, the valves are set in a way that provides for fluid flow along some desired path in the system to accomplish a corresponding part of the protocol. These steps can include, for example, running rinse fluids through valves and/or columns, running extraction solvents into columns, running sample into the columns, and running purified samples into the collectors.

The plumbing (fluidic circuitry) of the system as illustrated in FIG. 2 and FIG. 11 allows for control of the flow rate at the downstream side of the PLE cell 24, resulting in the production of a constant solvent flow independent of applied pressure and temperature. The following characteristics result from this feature of the system: 1) an efficient mass transfer rate, 2) a steady supply of fresh solvent to the PLE cell 24, 3) constant feeding of the silica column 54, and 4) reduced clogging of the PLE cell 24 that can arise due to static residence time of the solvent.

Replaceable, Quick-Connect Column

Having described PLE and HPLC systems that are adapted to provide relatively high throughput and relatively high reliability under operating conditions that can include relatively high temperatures and pressures, quick-connect, replaceable columns will now be described. The quick-connect, replaceable columns are adapted for holding, for example, solid samples in the PLE cell and/or silica, alumina, and carbon in the purification columns, during the extraction and (optional) purification processes, respectively. The quick-connect, replaceable columns used as PLE cells 24 in the PLE module 20 are structured and arranged to hold a mixture of (typically) sodium sulfate and between about 5 and about 200 grams of the solid sample being analyzed. The quick-connect, replaceable columns used as columns 22 in the purification module 18, i.e., the silica column 54, the alumina column 56, and the carbon column 60, are structured and arranged to hold about 100 grams of silica, alumina or carbon. Although reference in this disclosure is made to purification materials such as silica, alumina or carbon, the invention is not to be construed as being limited thereto.

The quick-connect columns 22, 24 are releasably couplable to the purification module 18 and/or to the PLE module 20 and, moreover, are structured and arranged for low cost, rapid replacement, and ease of disposal. As previously mentioned, the quick-connect, replaceable columns 22, 24 improve throughput without affecting reliability and/or accuracy, e.g., without cross contamination in sample analysis applications.

The quick-connect, replaceable columns 22, 24 are suitable for relatively low and relatively high operating pressures, e.g., between zero (0) and about 3000 psi, and for operating temperatures up to about 300 degrees Celsius (° C.) or about 570 degrees Fahrenheit (° F.). Accordingly, the cylindrical column portion and end cap assemblies making up the quick-connect columns can be made of reusable, rigid, high strength metal or metal-alloy that is easily cleaned, i.e., autoclaved, such as stainless steel, or, alternatively, can be made of, for example, polytetrafluoroethylene (PTFE), polypropylene, and other disposable, strong, rigid, high strength plastics and polymers. The disposability of plastic or polymer end cap assemblies is preferred over reusable stainless steel end cap assemblies that must be cleaned of autoclaved between uses.

Referring to FIGS. 3-6, the cylindrical column portion 25 and end cap assemblies 30 of the quick-connect, replaceable column 22, 24 will now be described. The column portion 25 is a hollow, thin-walled cylinder having an annulus 27 and an outer ring 21 that extends from a distal end 28 of the cylinder to a proximal end 29 of the cylinder. For illustrative purposes only, in FIG. 3B, the length of the column portion 25 is about 10.500 inches (in.), the outer diameter (O.D.) is about 0.98 in., and the inner diameter (I.D.) is about 0.885 in.

Conventionally, some portion of the inner surface 24 of the column portion 25 is threaded to receive a screw-type end cap assembly that is correspondingly reverse-threaded. However, threading often does not provide adequate sealing during operation at higher pressures. Threadings are also more difficult to clean, which is unacceptable for high accuracy measurements of contaminant concentration levels. Accordingly, the column portion 25 and the end cap assemblies 30 of the present invention are structured and arranged to be non-threaded. More particularly, the end cap assemblies 30 are structured and arranged to provide a tight, interference fit with the inner surface 24 of the column portion 25.

The end cap assembly 30 is hollow and substantially cylindrical in shape. The end cap assembly 30 includes a holding ring 35 having a circular annulus 32 of different diameters therethrough.

A first end 48 of the holding ring 35 is structured and arranged to provide a tight, interference fit with the inner surface 24 of each of the distal and proximal ends 28 and 29 of the column portion 25. More specifically, the first end 48 of the holding ring 35 is structured and arranged to provide a reliable, interference fit, i.e., watertight and airtight, with the inner surface 24 during relatively high operating temperatures and pressures.

A second end 49 of the holding ring 35 is structured and arranged to provide a tight, interference fit with the inner surface of a cup assembly (not shown). More specifically, the second end 49 of the holding ring 35 is structured and arranged to provide a reliable interference fit with the inner surface of the cup assembly during relatively high operating temperatures and pressures.

The first end 48 of the holding ring 35 is further adapted to include at least one sealing ring portion. For illustrative purposes only, in FIG. 4, sealing ring portions 33 and 34 are shown at the first end 48. The sealing ring portions 33 and 34 are adapted to removably secure sealing rings 56 and 54, respectively. The sealing rings 54 and 56, i.e., O-rings, can be made of metal, metal alloy, rigid plastic or flexible plastic. The sealing rings 54 and 56 are structured and arranged to provide an outer diameter that will provide a tight, interference fit with the inner surface 24 of the column portion 25.

At the first sealing ring portion 33 at the first end 48, sealing ring 56 is retained between first and second annular rings 38 and 39, which are structured and arranged around the entire outer periphery 31 of the holding ring 35, to restrain axial movement of the sealing ring 56. At the second sealing ring portion 34 at the first end 48, sealing ring 54 is retained between the second annular ring 39 and a first shoulder 44, which also is structured and arranged around the entire outer periphery 31 of the holding ring 35, to restrain axial movement of the sealing ring 54.

The second end 49 of the holding ring 35 is similarly adapted to include at least one sealing ring portion 36. For illustrative purposes only, in FIG. 4B, a single sealing ring portion 36 is shown at the second end 49. The sealing ring portion 36 is adapted to removably secure a sealing ring 52. The sealing ring 52, e.g., O-rings, can be made of metal, metal alloy, rigid plastic or flexible plastic.

At the sealing ring portion 36 at the second end 49, sealing ring 52 is retained between a third annular ring 47 and a second shoulder 46, which are structured and arranged around the entire outer periphery 31 of the holding ring 35, to restrain axial movement of the sealing rings 52.

The outer periphery 31 of the holding ring 35 also includes a third shoulder 45 that is structured and arranged to be in registration with the face ring 26 of the column portion 25. optionally, the portion of the holding ring 35 disposed between the second shoulder 46 and third shoulder 45 can be knurled, e.g., using diamond- or straight-knurling, or substantially flattened, for ease of assembly and removal.

Figure 6:
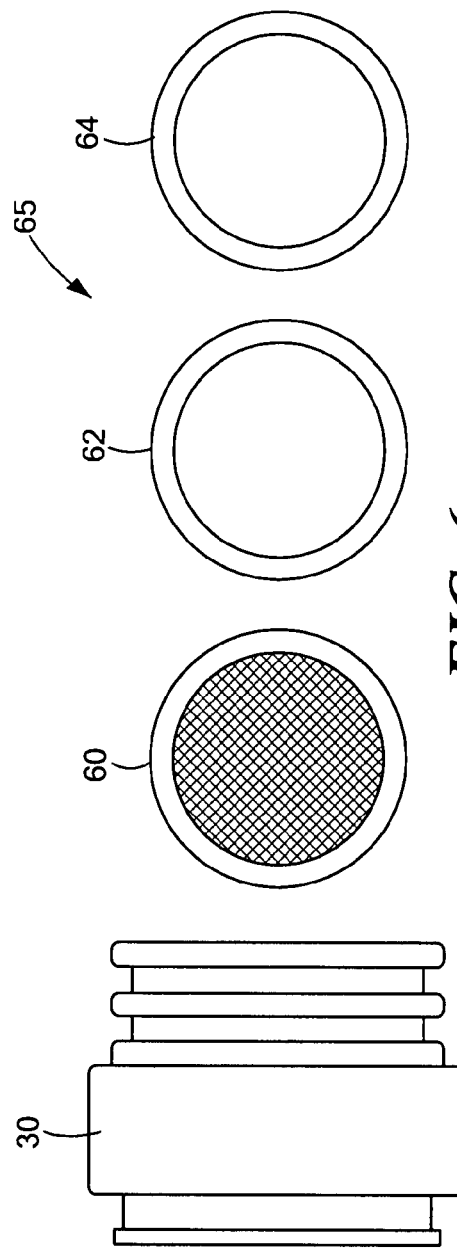
FIG. 6 shows an exploded view of the filter for an end cap assembly in accordance with the present invention.

The inner surface 40 of the annulus 32 of the holding ring 35 is further adapted to accommodate at least one filter assembly 65. For illustrative purposes only, FIG. 6 shows an embodiment in which the filter assembly 65 would be installed in the first end 48 of the holding ring 35. Those of ordinary skill in the art can appreciate that the holding ring 35 could also be modified to receive the filter assembly 65 through the second end 49.

The filter assembly 65 is structured and arranged to filter the high pressure solvents that travel through the column portion 22, 24, to prevent fine-grained solid material from escaping. Referring to FIG. 6, the filter assembly 65 includes a filter element 60 that is releasably and replaceably secured in the annulus 32 of the holding ring 35 between two filter sealing rings 62 and 64.

Figure 4B:
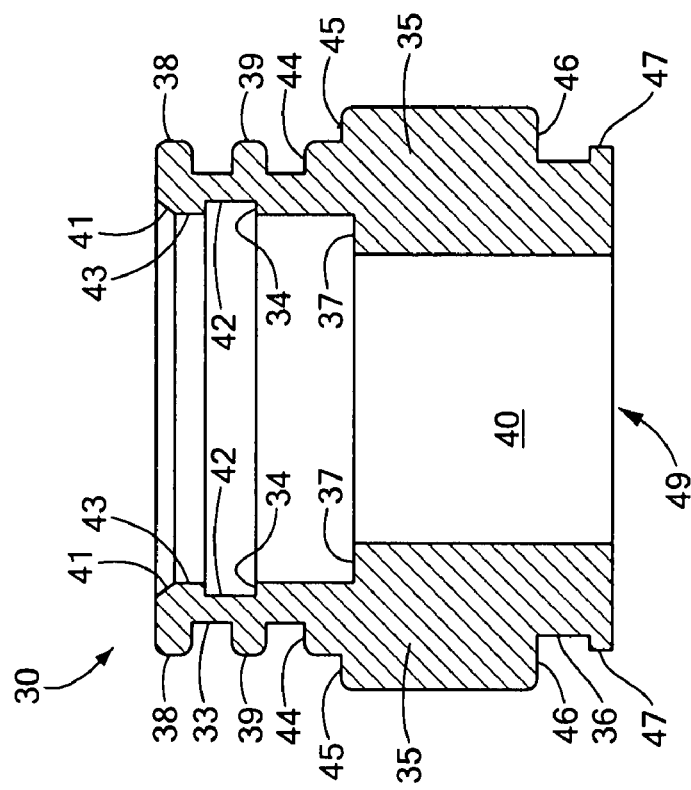
FIG. 4B shows a side section view of an end cap assembly in accordance with the present invention.
Figure 4A:
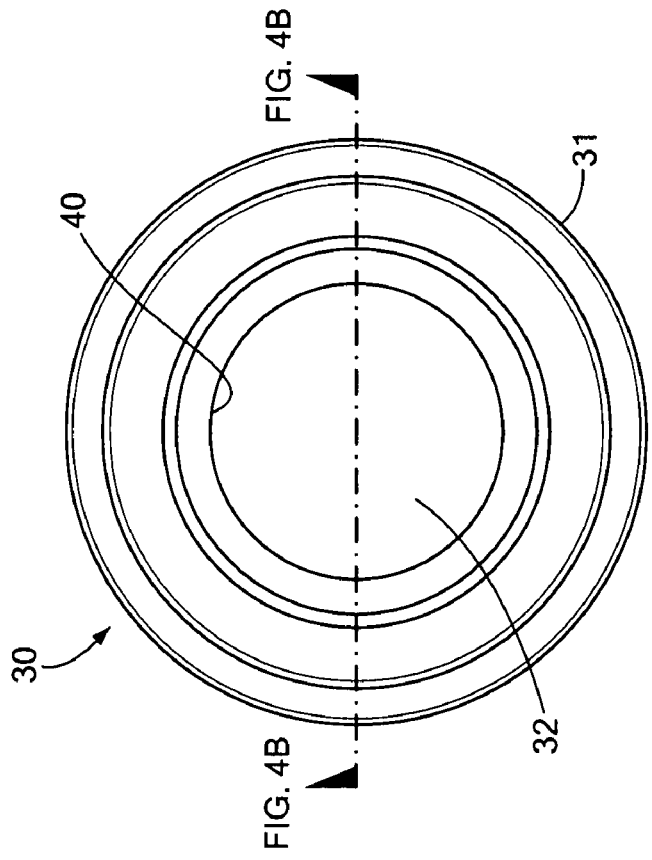
FIG. 4A shows a plan view of an end cap assembly in accordance with the present invention.
Figure 5:
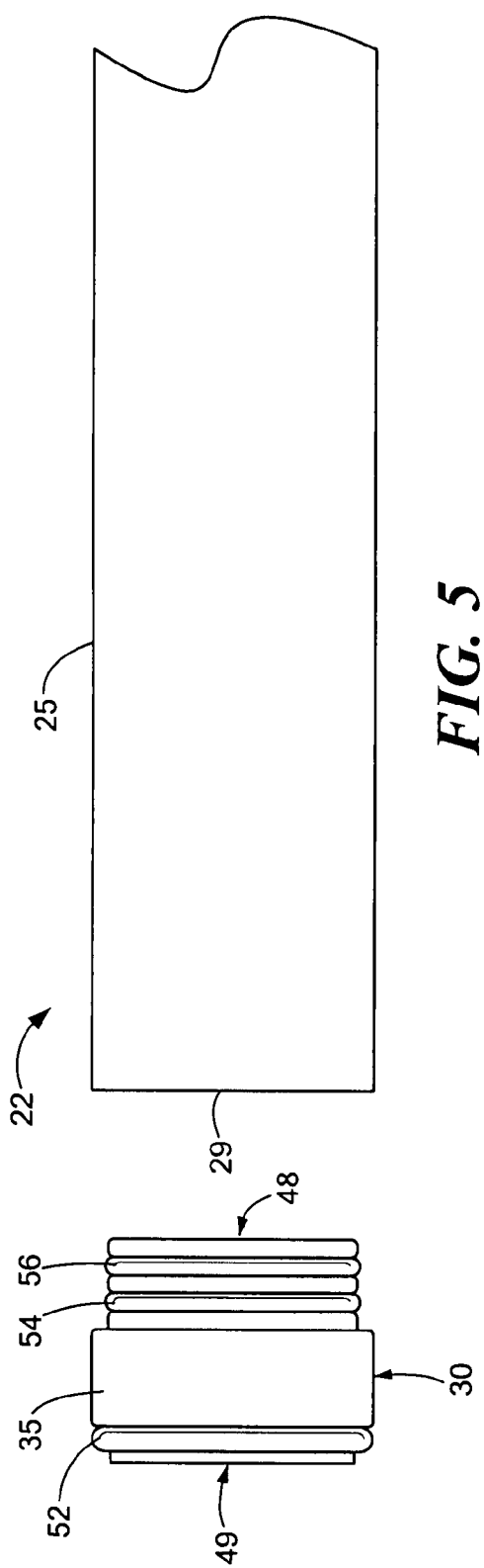
FIG. 5 shows one end of a quick connect column having a cylindrical portion and an end cap assembly in accordance with the present invention.

Referring to FIG. 4B, the inner surface 40 of the annulus 32 of the holding ring 35 is structured and arranged to include a first inner shoulder 37, a second inner shoulder 34, and an inner tab 43. The first inner shoulder 37 is adapted to retain the first filter sealing ring 64. Although, the filter sealing rings 62 and 64 can be made of metal, rigid plastic or flexible plastic O-rings, a rigid plastic first filter sealing ring 64 is preferred.

The filter 60 is disposed on top of the first filter sealing ring 64 and a second filter sealing ring 62 is press fit into a filter sealing region 42 to secure the filter 60 between the two filter sealing rings 62 and 64. The filter sealing region 42 includes a second inner shoulder 34 and an inner tab 43 that retain the second filter sealing ring 62 therebetween. Optionally, the inner tab 43 can be chamfered 41 near the first end 48 of the holding ring 35, to make it easier to insert, i.e., press fit, the second filter sealing ring 62 into the filter sealing region 42. Although, the filter sealing ring 64 can be made of metal, rigid plastic or flexible plastic O-rings, a flexible plastic second filter sealing ring 64 is preferred.

Top and Bottom Cup Assemblies

Each of the end cap assemblies 30 is further adapted to provide a tight, interference fit with a top and a bottom cup assembly 70 and 80, respectively. FIGS. 7A-7C and FIG. 8 show illustrative diagrams of top and a bottom cup assembly 70 and 80. The design of the top and bottom cup assemblies 70 and 80 is essentially the same. However, the top cup assembly 70 includes a depressed area 76 for attaching the top cup assembly 70 to the movable plunger 98 of a toggle clamp 96 and the bottom cup assembly 80 includes a plurality of, e.g., two, recesses 81 that accommodate posts or studs (not shown) for fixedly attaching the bottom cup assembly 80 to a base portion of the purification module 18 or the PLE module 20.

Figure 7B:
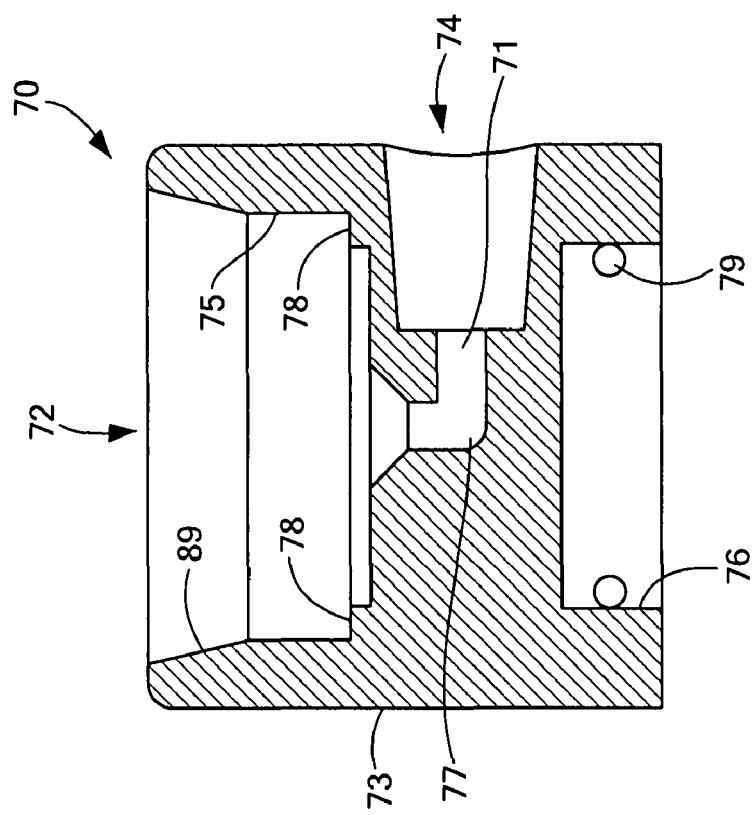
FIG. 7B shows a side view of a top cup assembly in accordance with the present invention.
Figure 7A:
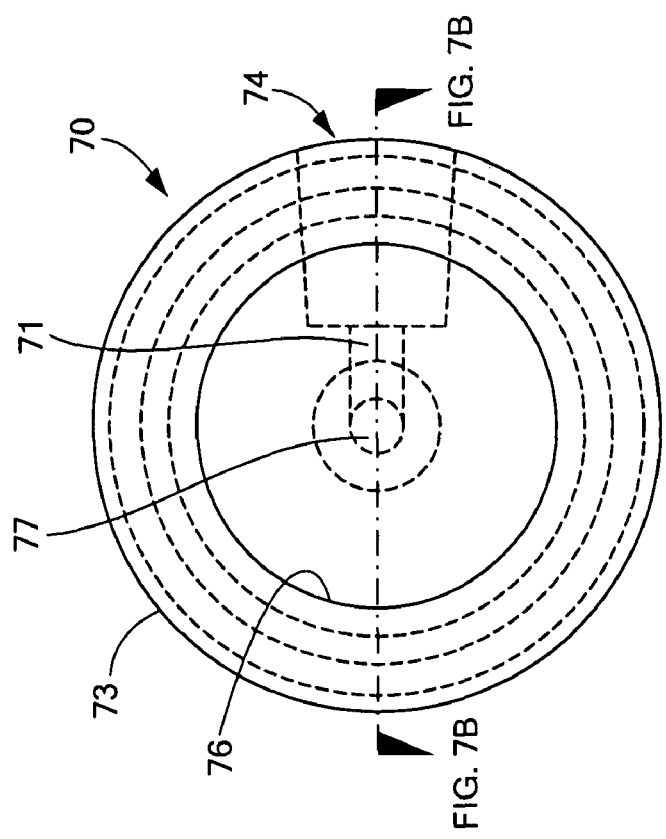
FIG. 7A shows a plan view of a top cup assembly in accordance with the present invention.

As shown in FIG. 7B, the top and bottom cup assemblies 70 and 80 are hollow cylinders 73 that include an end cap assembly receiving portion 72, a solvent input/output portion 74, and an internal fluid connection 77.

The end cap assembly receiving portion 72 is structured and arranged to provide a tight, interference fit between the inner surface 75 of the end cap assembly receiving portion 72 and the at least one sealing ring 52, 54, and/or 56 of the holding ring 35. More particularly, the end cap assembly receiving portion 72 is structured and arranged to provide a tight, interference fit at the relatively high operating temperatures and pressures. Optionally, for ease of inserting and aligning the end cap assembly 30 in the end cap assembly receiving portion 72, a portion of the inner surface 75 of the end cap assembly receiving portion 72 can include a tapered or chamfered opening 89. Although the angle of taper or chamfer shown in FIG. 7B and FIG. 7C is about 14 degrees, this is done for illustrative purposes only.

Figure 7C:
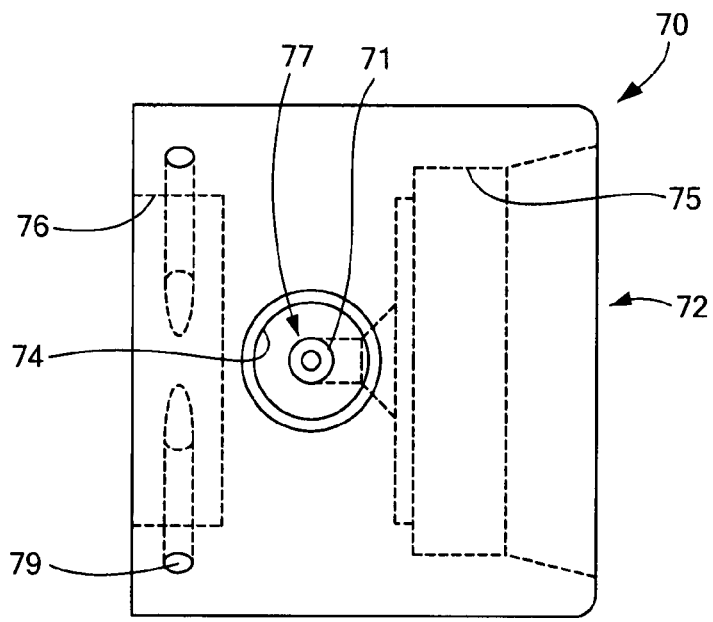
FIG. 7C shows a section view of a top cup assembly in accordance with the present invention.
Figure 8:
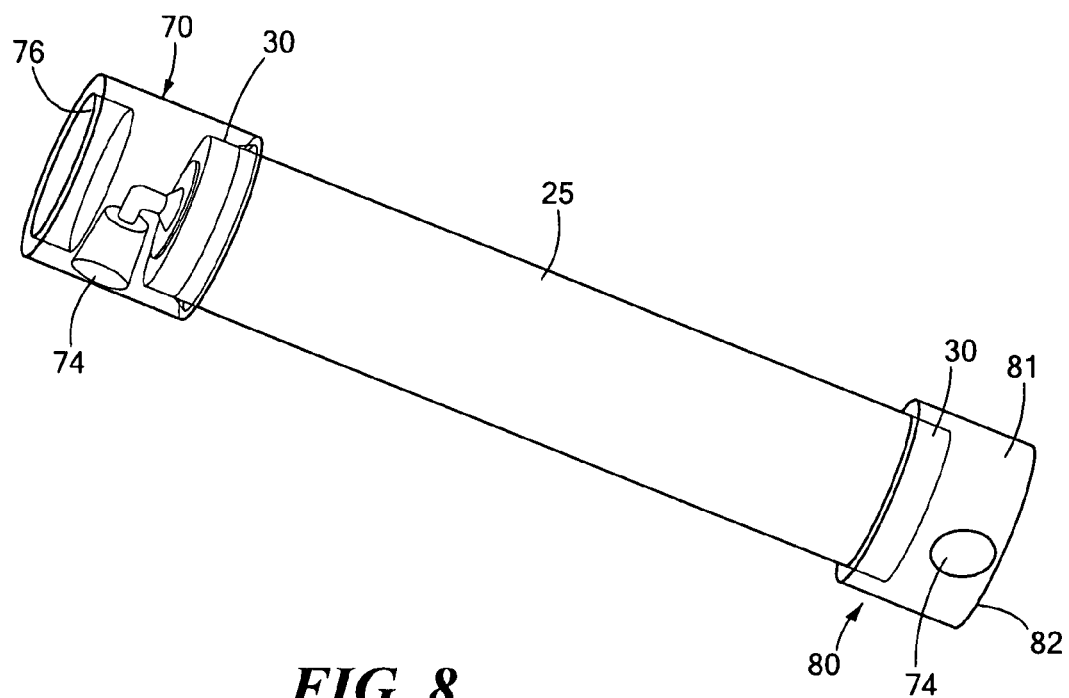
FIG. 8 shows a diagram of a quick connect column with top and bottom cup assemblies attached in accordance with the present invention.
Figure 9:
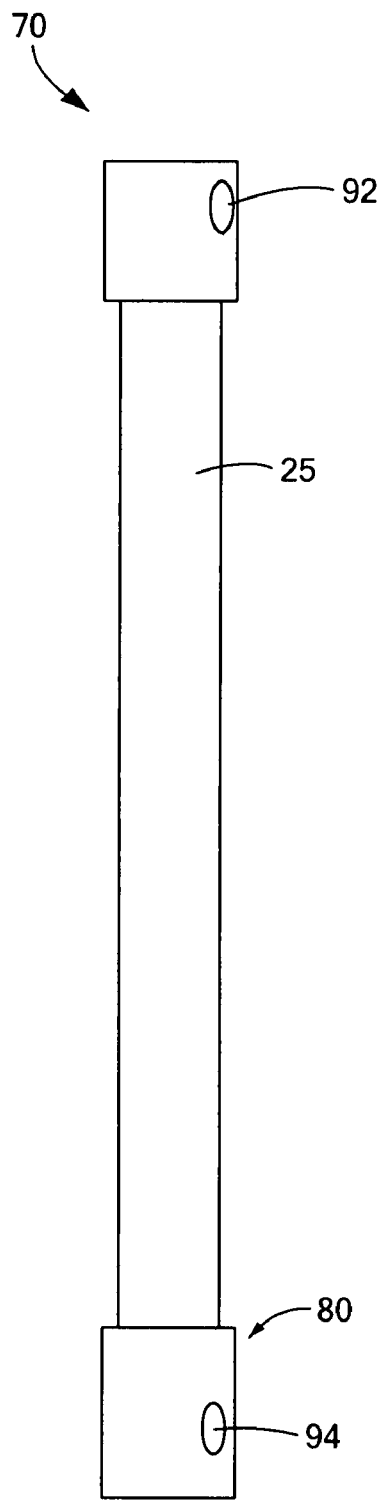
FIG. 9 shows another view of a quick connect column with top and bottom holding cups attached in accordance with the present invention.

Referring to FIG. 7C, the solvent input/output portion 74 is a substantially cylindrical, hollow cone that is structured and arranged to provide a tight, interference fit between external conduits 92 and 94 associated with the purification module 18 (or, alternatively, with a fitting (not shown) for the external conduits 92 and 94) and the cup assembly 70 or 80. More particularly, the solvent input/output portion 74 is structured and arranged to provide a tight, interference fit at the relatively high operating temperatures and pressures. Optionally, for ease of inserting and aligning the external conduits 92 and 94 in the solvent input/output portions 74, a portion of the inner surface of the solvent input/output portions 74 can be tapered or chamfered and/or a fitting can be used.

The internal fluid connection 77 is structured and arranged to transfer fluids from the annulus 32 at the second end 49 of the holding ring 35 to the input/output portion 74 (for the bottom cup assembly 80) and vice versa (for the top cup assembly 70). Although a 90-degree turn 71 and an I.D. of 0.125 in. are shown in FIG. 7B, this is done for illustrative purposes only. Indeed, those of ordinary skill in the art can appreciate that the dimensions and orientation of the internal fluid connection 77 can be modified to take advantage of fluid dynamics.

Figure 10:
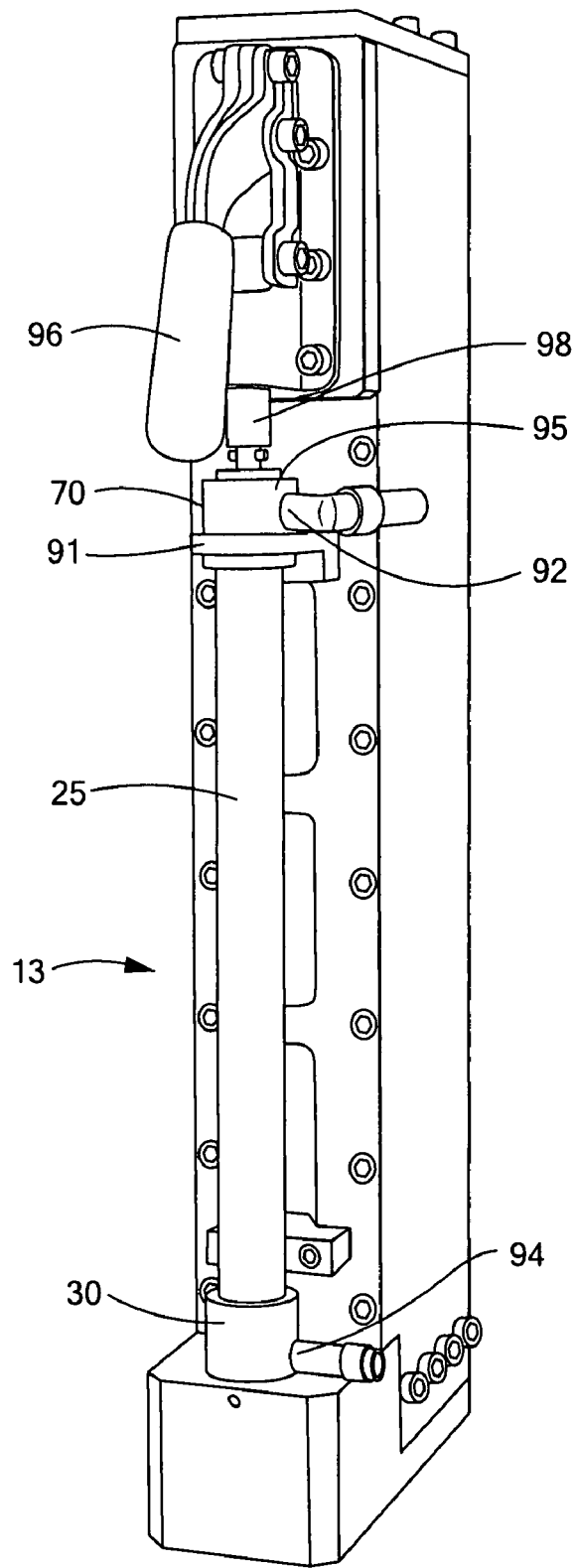
FIG. 10 shows a quick connect column that is mounted in the extraction module using a toggle clamp device in accordance with the present invention.

FIG. 10 shows a diagram of an illustrative purification module 18 and/or PLE module 20 adapted for use with quick-connect columns 22, 24 in accordance with the present invention. The purification module 18 and/or PLE module 20 include a base portion 99 on which the bottom cup assembly 80 is releasably attached, e.g., using a clamp (not shown) or posts or studs 81. An external conduit 94 is coupled to the fluid output portion 74 of the bottom cup assembly 80.

The top cup assembly 70 is releasably attached to the plunger 98 of a rotatable toggle clamp 96 via a connection portion 95. The connection portion 95 is frictionally engaged along the side walls of the depressed area 76 in the top cup assembly 70 so that when the toggle clamp plunger 98 translates in the longitudinal axis of the quick-connect column 22, 24, the top cup assembly 70 moves in the same direction. The toggle clamp 96 includes two operating states: an "up", loading state and a "down", operational state, which will be described in greater detail below.

In operation, after a desired amount of silica, alumina, carbon and/or mixture of solid sample and sodium sulfate has been introduced into the annulus 27 of the column portion 25, disposable, end cap assemblies 30 are inserted into the distal and proximal ends 28 and 29 of the column portion 25 to provide a tight interference fit. The aforementioned filter assembly 65 ensures that none of the silica, alumina, carbon or mixture of solid sample and sodium sulfate escapes from the annulus 27 of the column portion 25.

The end cap assembly 30 of one end 28 or 29 of the column portion 25 is then inserted into the end cap assembly receiving portion 72 of the bottom cup assembly 80, providing a tight, interference fit. The external conduit 94 can now be fluidly coupled to the PLE module 20 if it was not so coupled prior to installation of the column portion 25 in the bottom cup assembly 80.

The top cup assembly 70 can then be inserted into the end cap assembly receiving portion 72 of the other end cap assembly 30 of the column portion 25. As previously mentioned, the plunger 98 of toggle clamp 96 is releasably attached to a connection portion 95 disposed in the depressed area 76 of the top cap assembly 70. When the toggle clamp 96 is in an "up" position, a biased spring assembly (not shown) moves the plunger 96 and the top cup assembly 70 away from the end cap assembly 30. When the toggle clamp 96 is rotated into the "down" position (as shown in FIG. 10), the plunger 98 and top cap assembly 70 are pushed downwards towards the end cap assembly 30, introducing the end cap assembly 30 of the column portion into the end cap assembly receiving portion 72 of the top cup assembly 70, providing a tight, interference fit. The external conduit 92 can now be fluidly coupled to the PLE system if it was not so coupled prior to installation of the column portion 25 in the top cup assembly 70.

Optionally, to center or align the end cap assemblies 30 of the column portion 25 between the top and bottom cup assemblies 70 and 80, a column support 91 can be installed near the top cup assembly 70.

It will be apparent to those skilled in the art that modifications to and variations of the disclosed methods and apparatus are possible without departing from the inventive concepts disclosed herein, and therefore the invention should not be viewed as limited except to the full scope and spirit of the appended claims.

What is claimed is:

1. A quick-connect, replaceable column for holding a solid material for a pressurized liquid extraction system, the pressurized liquid extraction system including a rotatable toggle clamp having a plunger that is movable along an axis that is parallel to that of the replaceable column and a fluid source, the replaceable column comprising:
   a rigid, thread-less, hollow column portion having proximal and distal ends and an annulus therebetween;
   a first end cap assembly that is structured and arranged to sealingly engage the proximal end of the column to provide a tight, interference fit with said proximal end of the column portion at low to high temperatures and pressures;
   a second end cap assembly that is structured and arranged to sealingly engage the distal end of the column to provide a tight, interference fit with said distal end of the column portion at low to high temperatures and pressures;
   a top cup assembly that is hollow, cylindrical or substantially cylindrical in shape; includes a top portion, a bottom portion, and a sidewall portion; and includes an internal fluid connection for fluidly coupling the first end cap assembly to a fluid source:
   the top portion including a depressed area for releasably attaching the top cup assembly to the movable plunger,
   the bottom portion including a depressed area for releasably attaching the top cup assembly to the first end cap assembly, and
   the sidewall portion including a fluid input/output portion that is in fluid communication with the internal fluid connection; and
   a bottom cup assembly that is hollow, cylindrical or substantially cylindrical in shape;
   includes a top portion, a bottom portion, and a sidewall portion; and includes an internal fluid connection for fluidly coupling the second end cap assembly to a fluid source:
   the top portion including a depressed area for releasably attaching the bottom cup assembly to the second end cap assembly,
   the bottom portion including at least one recess for releasably attaching the bottom cup assembly to a base portion of the system, and
   the sidewall portion including a fluid input/output portion that is in fluid communication with the internal fluid connection;
   wherein each of the first and second end cap assemblies is of one piece construction and includes:
   a holding assembly having an outer surface and an annulus therethrough, the outer surface being adapted at a distal end and at a proximal end of the holding assembly to accommodate at least one sealing device for providing the tight, interference fit;
   a filter assembly that is adapted for disposal within the annulus of the holding assembly; and
   a plurality of filter assembly sealing rings being structured and arranged to provide a seal around a periphery of a respective top side or a respective bottom side of the filter assembly.

2. The replaceable column as recited in claim 1, wherein each of the first and second end cap assemblies is a disposable plastic material.

3. The replaceable column as recited in claim 1, wherein each of the first and second end cap assemblies is a reusable metal or metal alloy material.

4. The replaceable column as recited in claim 1, wherein each of the first and second end cap assemblies is made of a material selected from the group comprising a metal, a metal-alloy, a plastic, a flexible plastic, a rigid plastic, polypropylene or polytetrafluoroethylene.

5. The replaceable column as recited in claim 1, wherein a portion of an outer surface of each of the first and second end caps is knurled for improve gripping.

6. The replaceable column as recited in claim 1, wherein a portion of an outer surface of each of the first and second end cap assemblies has a substantially flatten surface for improved gripping.

7. The quick-connect, replaceable column as recited in claim 1, wherein each of the first and second end cap assemblies includes at least one O-ring as a sealing device to provide the tight, interference fit.

8. The quick-connect, replaceable column as recited in claim 1, wherein the operating temperatures are between zero (0) and about 300 degrees Celsius (570 degrees Fahrenheit).

9. The quick-connect, replaceable column as recited in claim 1, wherein the operating pressures are between about zero (0) and about 3000 psi.

10. The quick-connect, replaceable column as recited in claim 1, the pressurized liquid extraction system further including at least one post, each of which is structured and arranged to be in registration with a corresponding recess of the at least one recess in the bottom portion of the bottom cup assembly.

11. The quick-connect, replaceable column as recited in claim 1, wherein the solvent input/output portion is adapted to provide a tight, interference fit between the top cup assembly and a fluid conduit.

12. The quick-connect, replaceable column as recited in claim 11, wherein the top cup assembly also includes an internal fluid connection to provide fluid communication between the input/output portion and the first end cap assembly.

13. The quick-connect, replaceable column as recited in claim 1, wherein the depressed area of top cup assembly includes a peripheral side wall that is at least one of tapered and chamfered.

* * * * *

UNITED STATES PATENT AND TRADEMARK OFFICE
CERTIFICATE OF CORRECTION

PATENT NO. : 8,062,520 B2
APPLICATION NO. : 11/894743
DATED : November 22, 2011
INVENTOR(S) : Hamid Shirkhan It is certified that error appears in the above-identified patent and that said Letters Patent is hereby corrected as shown below:

Column 12, claim 11, line 11, please delete the word "solvent".

Signed and Sealed this
Twenty-third Day of October, 2012

David J. Kappos
*Director of the United States Patent and Trademark Office*